(No Model.)
A. O. FRICK.
TRACTION ENGINE.
No. 266,456. Patented Oct. 24, 1882.
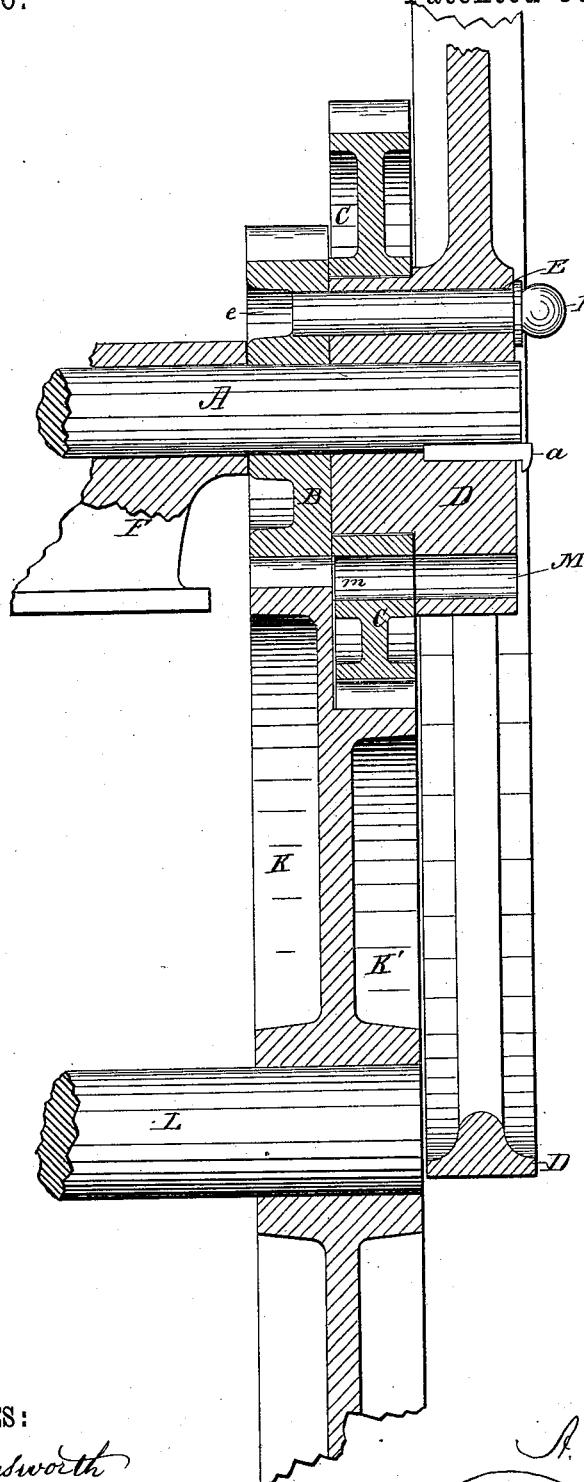
WITNESSES:
W. W. Hollingsworth
W. L. Stevens.
INVENTOR:
A. O. Frick
BY
ATTORNEYS.

UNITED STATES PATENT OFFICE.

ABRAHAM O. FRICK, OF WAYNESBOROUGH, PENNSYLVANIA.

TRACTION-ENGINE.

SPECIFICATION forming part of Letters Patent No. 266,456, dated October 24, 1882.

Application filed September 5, 1882. (No model.)

*To all whom it may concern:*

Be it known that I, ABRAHAM O. FRICK, a citizen of the United States, residing at Waynesborough, in the county of Franklin and State of Pennsylvania, have invented a new and useful Improvement in Gearing for Traction-Engines, of which the following is a specification.

My invention relates to traction-engines which use a fly-wheel for evening and steadying the motion by giving off the power, to aid in sudden emergencies or in intermittent strains, which has been accumulated in the intervals between severe labor, said fly-wheel serving also as a band-wheel when doing local work; and the objects of my improvements are, first, to provide means whereby the fly-wheel may be readily connected with a spur-wheel for the purpose of operating the traction-wheels, or disconnected therefrom when using the band-wheel in local work; second, to provide means whereby two rates of speed may be given to the traction-wheels in order that more force may be applied to the traction-wheels for ascending hills, the engine advancing along the road at a rate proportionally slower as the force applied is increased, the engine revolving all the time at the same speed and producing the same amount of power. I attain these objects by mechanism hereinafter fully described and claimed, reference being had to the accompanying drawing, which is a sectional elevation, longitudinal with respect to the engine-shaft.

A represents the main shaft of the engine, to which the fly-wheel D is secured by any usual method—as, for instance, by the key *a*.

B is a toothed pinion-wheel, loose to revolve on shaft A, engaging the spur-wheel K.

C is a similar but larger pinion, revolving upon the hub of the fly-wheel D, engaging the spur-wheel K', which is rigidly secured to the spur-wheel K, and both wheels K and K' are rigidly secured to the shaft L, which drives the traction machinery. At E is a hole through the hub of the fly-wheel D, mating a similar hole, *e*, through the body of the pinion B, parallel to the shaft A. H is a pin fitting said holes E *e*, easily serving to connect the pinion B with the fly-wheel D, in order to communicate motion to the traction machinery by means of the spur-wheel K. At M is another hole of the same size as hole E, through the hub of the fly-wheel D, mated by a hole, *m*, through the larger pinion C.

When the pin H connects wheels D and B, as shown, wheel C is free to revolve on the hub of wheel D by the motion communicated through gears K K'; but when pin H is placed in holes M *m* wheel C is connected with wheel D and shaft L is revolved by means of spur-wheel K', while wheel B is free to revolve on shaft A by the motion communicated through spur-wheel K.

The pin-hole M is farther from the center of wheel D than the hole E, and the pin H cannot be pushed through hole M, so as to connect with both the wheels C and B at the same time.

It will be seen that the pillow block or bearing F of the crank-shaft A serves as a shoulder to keep wheel B in place, and that wheel B serves the same purpose in keeping wheel C on the hub of wheel D.

In order that the hub of wheel D may be made as small a bearing as possible for wheel C, the pin-hole E is placed as near the shaft A as security will allow, and it and pin H are made large in proportion to the strain on them consequent to being near the center.

By placing the pin H in holes M *m* the speed of the shaft L and traction machinery will be increased at the expense of force, and when pin H is placed in holes E *e* the force of shaft L and the traction machinery run thereby will be increased at the expense of speed.

I am aware that a pin has before been used to connect wheels together in a manner similar to the one here described, but varying from mine in passing the pin through a hole in a flange of the pinion-wheel exterior to the circumference of the teeth; but that I could not do and use the hub of the fly-wheel as a shaft for another pinion, as herein described, and I do not claim that as my invention; but

What I claim, and wish to secure by Letters Patent, is—

1. The combination, with the spur-wheel K, shaft L, pillow-block F, main shaft A, and fly-wheel D, secured thereon and provided with a turned hub for a bearing for the gear-wheel C, of the pin-hole E, extending through the hub of wheel D, and said turned bearing thereon, the pin-hole *e* in wheel B, within the circle of its teeth, and the pin H, fitted easily in holes E $e$, as shown and described.

2. The combination, with the shaft L, spur-wheel K′, the pinion C, meshing therein, the pillow-block F, the shaft A, the pulley D, secured thereon and provided with a turned hub serving as a bearing for the wheel C, of the pin-holes M $m$ in wheels D C, respectively, and the pin H, for the purpose of revolving shaft L by means of said wheels C and K′, as shown and described.

3. The combination, with the shaft L, the two spur-wheels K K′, of different sizes, firmly secured thereon, the pillow-block F, shaft A, the fly-wheel D, secured thereon, provided with a turned hub, the pinion C, revolving freely on said hub, the pinion B, revolving freely on shaft A, the holes E M in wheel D, and the holes $e$ $m$ in wheels B and C, respectively, of the pin fitted to enter said holes easily, as shown and described.

ABRAHAM O. FRICK.

Witnesses:
   SOLON C. KEMON,
   CHAS. A. PETTIT.